(12) United States Patent
Salvi

(10) Patent No.: US 9,153,201 B2
(45) Date of Patent: Oct. 6, 2015

(54) REAL-TIME ORDER-INDEPENDENT TRANSPARENT RENDERING

(71) Applicant: Intel Corporation, Santa Clara, CA (US)

(72) Inventor: Marco Salvi, San Francisco, CA (US)

(73) Assignee: INTEL CORPORATION, Santa Clara, CA (US)

(*) Notice: Subject to any disclaimer, the term of this patent is extended or adjusted under 35 U.S.C. 154(b) by 284 days.

(21) Appl. No.: 13/681,576

(22) Filed: Nov. 20, 2012

(65) Prior Publication Data

US 2013/0314431 A1    Nov. 28, 2013

Related U.S. Application Data

(60) Provisional application No. 61/643,780, filed on May 7, 2012.

(51) Int. Cl.
*G09G 5/02* (2006.01)
*G06T 15/00* (2011.01)
*G06T 15/50* (2011.01)

(52) U.S. Cl.
CPC ............... *G09G 5/02* (2013.01); *G06T 15/503* (2013.01); *G06T 2210/62* (2013.01)

(58) Field of Classification Search
CPC ............ G06T 15/503; G06T 2210/62; G09G 2340/10; G09G 5/377
USPC .................................................. 345/589–592
See application file for complete search history.

(56) References Cited

PUBLICATIONS

Salvi; Adaptive Transparency; Game Developers Conference 2011; Feb. 28-Mar. 4, 2011.*
Barta et al.; Order Independent Transparency with Per-Pixel Linked Lists; Proceedings of CESCG 2011: THe 15th Central European Seminar on Computer Graphics; May 2-4, 2011.*
Jouppi, et al., $Z^3$: An Economical Hardware Technique for High-Quality Antialiasing and Transparency, 1999, 10 pages.

* cited by examiner

*Primary Examiner* — Carlos Perromat
(74) *Attorney, Agent, or Firm* — International IP Law Group, P.L.L.C.

(57) ABSTRACT

A method and system for producing an image to be displayed are disclosed herein. The image includes a plurality of pixels. An example of the method includes dedicating a fixed amount of memory to store a data structure for a pixel of plurality of pixels. The method also includes building a visibility function and determining a partial color sum for each fragment of the plurality of fragments. A pixel color is determined using the visibility function and the partial color sums.

27 Claims, 13 Drawing Sheets

R=2
Color[R+1] += Color[R] * Trans[R-1] / Trans[R]

1200

REAL-TIME ORDER-INDEPENDENT TRANSPARENT RENDERING

This application claims priority to U.S. Provisional Application Ser. No. 61/643,780, filed May 7, 2012.

BACKGROUND ART

Correctly rendering transparent surfaces might require sorting many transparent fragments back-to-front or front-to-back for each pixel on the screen. This operation can be very intensive from a computational and memory bandwidth standpoint, and is generally slow and power inefficient. Known methods employ an a priori unbounded amount of memory, which is proportional to the amount of visible transparent fragments on the screen.

Some methods of approximation that do not require sorting transparent fragments are known. These methods are relatively faster and more efficient, but still require an unbounded amount of memory. Additionally, these methods may use two or more rendering passes in order to generate the desired image.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

As discussed above, rendering transparent objects may be intensive from a computational and memory bandwidth standpoint. Moreover, rendering transparent objects in real time may aggravate the computationally and memory intensive operation. When rendering graphics, the geometry of a transparent object may be modeled using a mesh of several hundreds or thousands of polygons for each frame. For ease of description, the polygon used to model the geometry of transparent objects is a triangle. However, any polygon may be used to model the geometry of transparent objects.

Each triangle can generate one or more fragments, and each fragment adds a layer of color to the pixels contained within the screen space of the fragment. For example, if an image that is rendered includes looking through ten glasses, each glass contains fragments that contribute to the color of the pixels that are rendered within the screen space of the glass. As light from the image being rendered passes through each glass, the amount of light passing through each glass may be reduced. In embodiments, the amount of light being transmitted by a fragment of a pixel of a transparent object is referred to as the transmittance of the pixel. Furthermore, a pixel may have several fragments that are rendered in any order. The front-most fragment is the fragment that is closest to the viewer, wherein the viewer is a camera or human eye viewing the image. The back-most fragment is the fragment that is furthest from the viewer.

Figure 1:
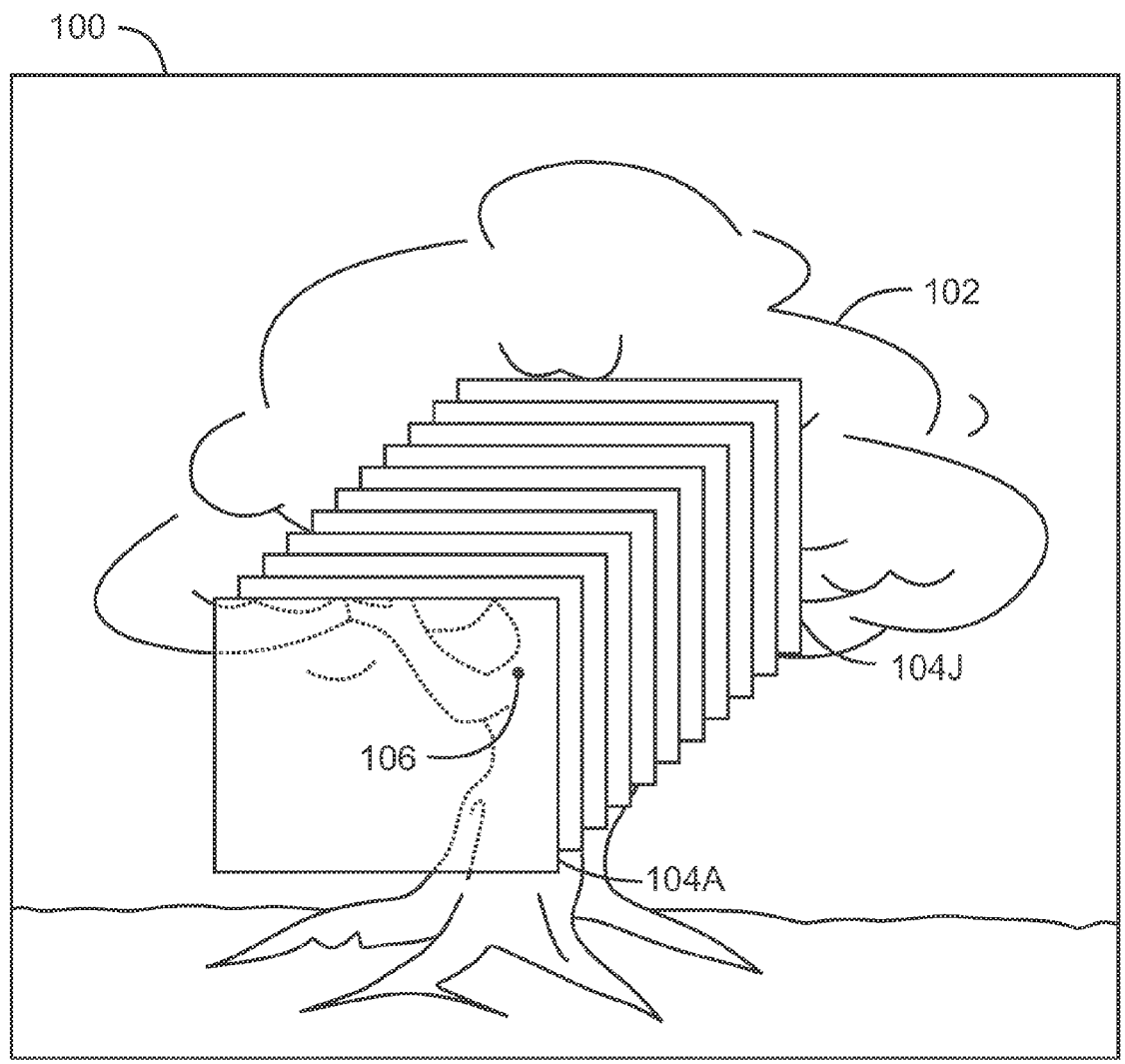
FIG. 1 is a frame with transparent objects, in accordance with embodiments.

FIG. 1 is a frame 100 with transparent objects, according to embodiments. The frame 100 includes a tree object 102, and ten transparent glass panes 104A through 104J. The tree object 102 may be visible through all ten transparent glass panes 104A through 104J. The transparent glass pane 104A is the front-most fragment, while the transparent glass pane 104J is the back-most fragment. Although the image is shown with all ten transparent glass panes 104A through 104J in front of the tree object 102, the image may include rendering glass panes that intersect the tree object 102. In such a scenario, parts of the tree object 102 are in front of the glass panes and other parts of the tree object 102 are behind the glass panes.

For ease of explanation, the frame 100 is shown in two dimensions. However, the frame 100 may include transparent objects that are three dimensional (3D). Accordingly, in order to be rendered in 3D, the tree object 102 and the ten transparent glass panes 104A through 104J may be divided into a polygon mesh. In embodiments, the polygon mesh may be a triangular mesh. The polygon mesh defines the shape of a 3D object. In embodiments, the shape of the 3D object may be referred to as the geometry of the 3D object. The polygonal mesh includes vertices, lines, edges, and faces that are used to define the shape of the 3D object. For ease of description, the techniques described herein are described using a triangular mesh. However, any type of mesh may be used in accordance with the present techniques.

In examples, a triangle of the transparent glass pane 104A that includes the pixel 106 may completely "cover" the triangles of the tree object 102 that contain the pixel 106 and the triangles of the remaining transparent glass panes 104B through 104J that also contain the pixel 106. As used herein, covering a triangle means that in order to be correctly rendered, the entirety of a first triangle should be rendered over the entirety of a second triangle. In such a scenario, the triangles of each transparent object that contains pixel 106 may be sorted from back to front, and then placed in a frame buffer. The contents frame buffer may be sent to specialized hardware for rendering in a sequential order. The specialized hardware may include, but is not limited to, a graphics processing unit (CPU).

In some examples, two or more triangles of the triangular meshes may overlap when rendering a particular pixel, such that a fragment of a first triangle covers a fragment of a second triangle. However, the first triangle does not completely cover the second triangle. In such an example, the fragment of the first triangle that covers the fragment of the second triangle for a particular pixel should be placed in front of the fragment of the second triangle when the triangles are sorted. However, the remaining fragments of the second triangle may not be sorted behind the remaining fragments of the first triangle in order to be correctly rendered. The triangles may be split into fragments so that the fragments may be correctly sorted. The sorting time for each frame may vary depending on the number of split triangles that should be sorted. The split triangles are then sent to a frame buffer, and then rendered using a GPU. As the viewing angles of the 3D transparent objects change, the process of splitting, sorting, and rendering are repeated. The geometry of the 3D transparent objects is also re-computed as the viewing angles change. Since the amount of splitting and sorting are unknown, the process of splitting and sorting the triangles of the transparent objects may use an unbounded amount of memory to store the split and sorted triangles. Furthermore, re-computing the geometry of the 3D objects may be a computationally intensive operation. In examples where fragments are sorted on a per pixel level, the sorting time for each frame may vary depending on the total number of fragments that overlap a single pixel. When fragments are sorted at the pixel level, the process may also use an unbounded amount of memory as well as being a computationally intensive operation.

For images that are not rendered in real-time, a list of all overlapping transparent fragments may be stored for each pixel. Each fragment within the list may be sorted from back to front and rendered in the correct order. However, the list of overlapping transparent fragments may not be efficient to be obtained for real-time graphics. Accordingly, embodiments described herein relate to rendering transparent images independent of order in real-time. The amount of memory used to render the transparent images may be bounded. Additionally, in embodiments, the transparent geometry may be rendered with one rendering pass.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

Figure 2:
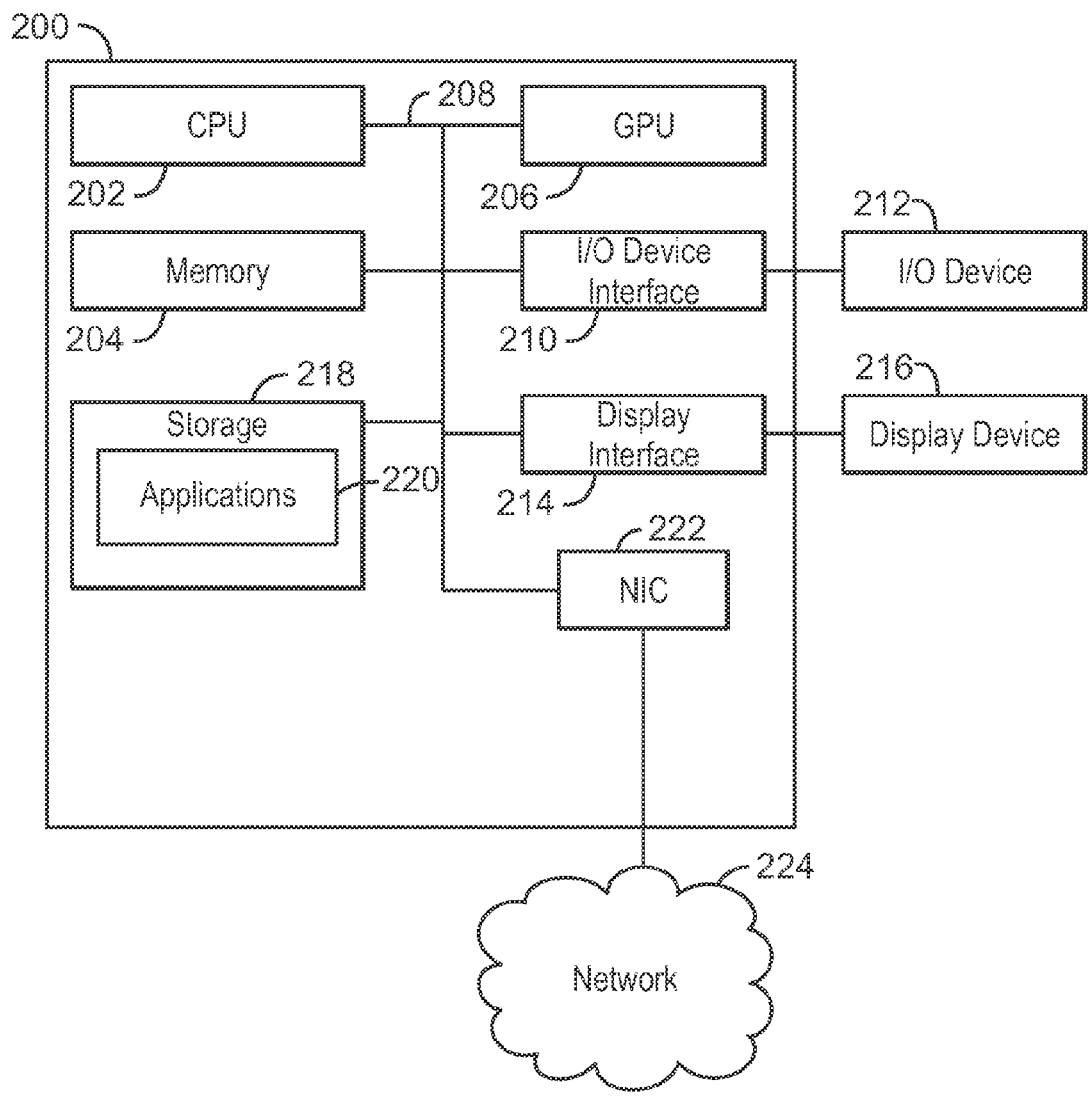
FIG. 2 is a block diagram of a computing device that may be used for rendering an image, in accordance with embodiments.

FIG. 2 is a block diagram of a computing device 200 that may be used for rendering an image, in accordance with embodiments. The computing device 200 may be, for example, a laptop computer, desktop computer, tablet computer, mobile device, server, or cellular phone, among others. The computing device 200 may include a central processing unit (CPU) 202 that is configured to execute stored instructions, as well as a memory device 204 that stores instructions that are executable by the CPU 202. The memory device 204 may also store a visibility function and other data structures as described herein. The CPU 202 can be a single core processor, a multi-core processor, a computing cluster, or any number of other configurations. Furthermore, the computing device 200 may include more than one CPU 202. The instructions that are executed by the CPU 202 may be used to implement real time order-independent transparency. The memory device 204 can include random access memory (RAM), read only memory (ROM), flash memory, or any other suitable memory systems. For example, the memory device 204 may include dynamic random access memory (DRAM). Indulges The computing device 200 may also include a graphics processing unit (GPU) 206. As shown, the CPU 202 may be connected through a bus 208 to the GPU 206. The GPU 206 may be configured to perform any number of graphics operations within the computing device 200. For example, the GPU 206 may be configured to render or manipulate graphics images, graphics frames, videos, or the like, to be displayed to a user of the computing device 200.

The CPU 202 may be connected through the bus 208 to input/output (I/O) components using an I/O device interface 210 configured to connect the computing device 200 to one or more I/O devices 212. The I/O devices 212 may include, for example, a keyboard and a pointing device, wherein the pointing device may include a touchpad or a touchscreen, among others. The I/O devices 212 may be built-in components of the computing device 200, or the I/O devices 212 may be devices that are externally connected to the computing device 200.

The CPU 202 may also be linked through the bus 208 to a display interface 214 configured to connect the computing device 200 to a display device 216. The display device 216 may include a display screen that is a built-in component of the computing device 200. The display device 216 may also include a computer monitor, television, or projector, among others, that is externally connected to the computing device 200.

The computing device 200 may also include a storage device 218. The storage device 218 is a physical memory such as a hard drive, an optical drive, a thumbdrive, an array of drives, or any combinations thereof. The storage device 218 may also include remote storage drives. Like the memory device 204, the storage device 218 may also store a visibility function and other data structures as described herein. The storage device 218 may also include one or more applications 220. The applications 220 include, but are not limited to, video playback applications and gaming applications. In examples, instructions that are executed by the CPU 202 may be used to implement real time order-independent transparency when an application 220 sends transparent objects to the GPU 206 for rendering.

A network interface controller (NIC) 222 may be configured to connect the computing device 200 to a network 224. The network 224 can be a wire line network, a wireless network, or a cellular network. The network 224 may be any wide area network (WAN), any local area network (LAN), or the Internet, among others. For example, network 224 can be 3GPP LTE network or a WiFi network.

The block diagram of FIG. 2 is not intended to indicate that the computing device 200 is to include all of the components shown in FIG. 2. Further, the computing device 200 may include any number of additional components not shown in FIG. 2, depending on the details of the specific implementation.

A visibility function may be used to represent the transmission of light through one or more transparent objects. The visibility function may also be used to represent the absorption of light as it passes through one or more transparent objects. The visibility function enables the fragments of transparent objects to be composited in the correct order for rendering, without sorting all the fragments that contribute to a pixel. As discussed above, sorting a variable number of fragments may introduce a variable amount of time to the rendering process. By eliminating the sorting of fragments, the rendering process is more stable and better suited for real time rendering when compared to methods that sort the fragments of the transparent objects.

The visibility function may be plotted by plotting transmittance versus the distance away from the camera. Generally, as the distance from the camera increases, the light passes through several objects and the transmittance decreases. In embodiments, the visibility function is a collection of step functions. For example, when viewing the outside through a window, part of the light produce outside is absorbed by the window, while some of the light is transmitted. In embodiments, some light may be scattered. Accordingly, the visibility function is a representation of the amount of light that passes through each fragment per pixel.

A visibility function may be computed using the following formula:

$$vis(z) = \prod_{0 < z_i < z} (1 - \alpha_i) \quad (1)$$

where $\alpha$ is the transparency factor for the ith fragment and z is the distance from the viewer of the ith fragment.

Figure 3:
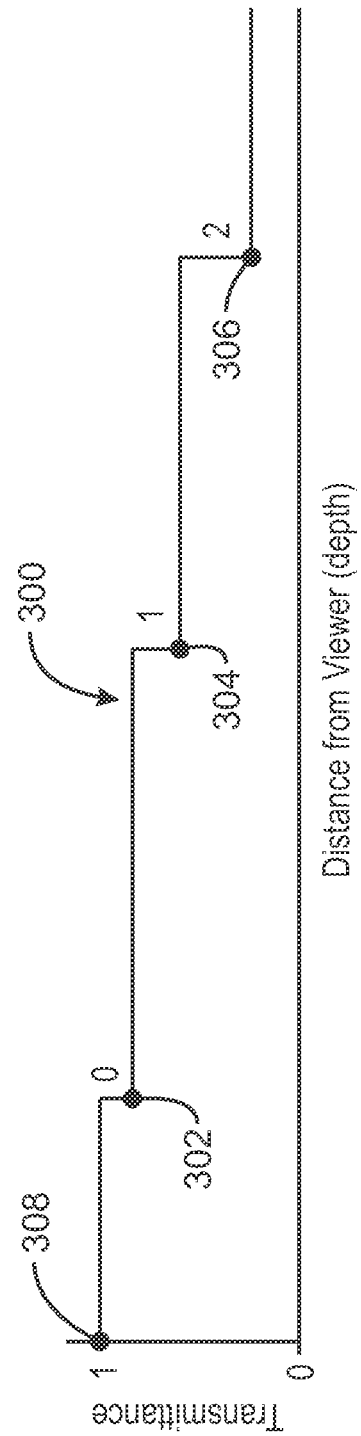
FIG. 3 is a graph showing a visibility function, in accordance with embodiments.

FIG. 3 is a graph showing a visibility function 300, in accordance with embodiments. As discussed above, the visibility function 300 is represented as a plot of transmittance versus distance from a viewer (depth) for each pixel. The graph shows the visibility function 300 as multiple step functions. The visibility function 300 includes three steps at the node (0) at reference number 302, the node (1) at reference number 304, and the node (2) at reference number 306. Each node in the visibility function 300 corresponds to a fragment of the corresponding pixel. Accordingly, the pixel has three transparent fragments that are rendered. The fragments are rendered using the visibility function from back to front, such that the node (0) at reference number 302 is rendered first, then the node (1) at reference number 304, and finally the node (2) at reference number 306.

In embodiments, a GPU may be used to read-modify-write data stored at arbitrary locations in memory without resulting in data races otherwise caused by processing thousands of fragments in parallel at the same time. In this manner, the visibility function may be built by obtaining a list of all fragments that contribute to a pixel. The fragments may be then read and placed at the correct location within the visibility function. The visibility function will desirably employ a fixed amount of memory, so that buffering of all of the transparent fragments up front may be skipped. Therefore, a data structure containing pixel data may be directly updated in a streaming fashion, as long as a graphics processor can, for each fragment, read from memory the visibility function data, update it and store it back to memory while avoiding data races. By avoiding data races, the scenario where two or more fragments that contribute to the same pixel are working on the same visibility function at the same time is avoided. In embodiments, for a given pixel on the screen the visibility function and all related data should be updated only by a single fragment at any given time in order to avoid data corruptions. These data corruptions are also known as data races.

After all transparent objects are submitted for rendering, a data structure is obtained for each pixel that represents a visibility function of the type shown in FIG. 3. Additionally, another data structure may be obtained for each pixel that contains partial sums of color data. The data structure containing partial sums of color data may also be updated in a streaming fashion.

Appropriately, each of the node (0) at reference number 302, the node (1) at reference number 304, and the node (2) at reference number 306 have an associated transmittance value and depth value that is represented by the visibility function. At reference number 308, the visibility function is closest to the viewer, and has a transmittance value of 1. As the distance from the viewer increases, the light passes through each of the node (0) at reference number 302, the node (1) at reference number 304, and the node (2) at reference number 306. At each node, the transmittance value decreases, as a portion of the light is absorbed by the fragment that corresponds to each node.

Additionally, each of the node (0) at reference number 302, the node (1) at reference number 304, and the node (2) at reference number 306 have an associated color value that is stored in another data structure as the visibility function is built. In this manner, the visibility function and the final pixel color can be computed at the same time, with one rendering pass. The visibility function may be built as described above, and the contribution to the pixel color may be evaluated at each step of the visibility function.

The contribution of N overlapping transparent fragments to the final pixel color is computed as a sum of N terms, with each term in the sum given by the fragment color (c) multiplied by its α (transparency factor) and a visibility term that accounts for all the fragments between the camera/eye and the current term:

$$\sum_{i=0}^{N-1} c_i \alpha_i vis(z_i) \qquad (2)$$

where c=fragment color, α=fragment transparency, and vis (z)=visibility evaluated at distance z from the eye.

The sum referred to in Equation (2) may be split into a partial color sum (M) and the visibility function. The partial color sum M is color multiplied by the transmittance for each of N steps within the visibility function. The number of steps that can be encoded in the visibility function is limited given the fixed amount of memory provided for the visibility function. When a new transparent fragment is injected into the pipeline for the pixel, the visibility function for the pixel is updated, and at the same time the partial color sum related to the new fragment is computed as the color contribution of the incoming fragment multiplied by its transmittance term (i.e. 1−α). At the end of one rendering pass, the final pixel color is computed by using Equation (2) (potentially including an additional term that accounts for the fully opaque background). This method does not require rendering the transparent geometry twice, and can be used to improve performance and to consume less power when compared to other rendering methods.

Figure 4:
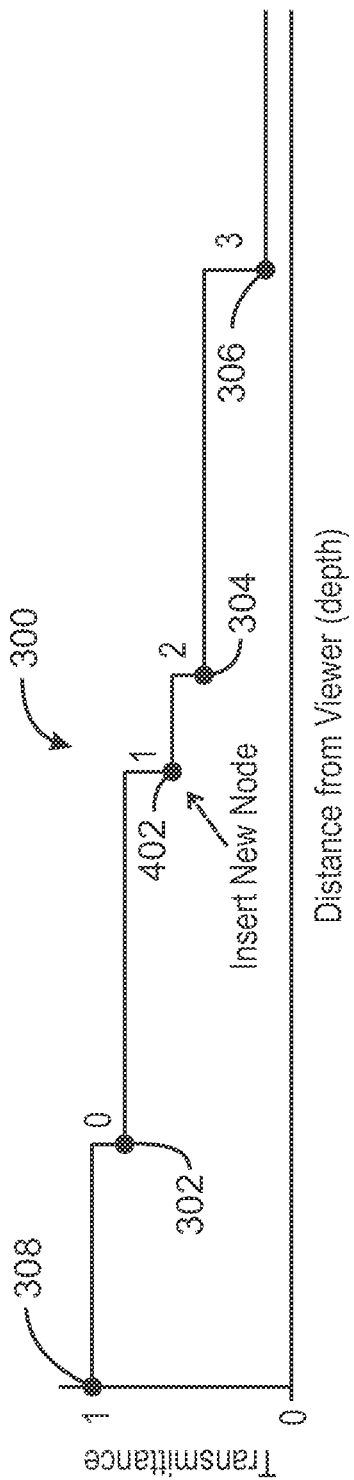
FIG. 4 is a graph showing the visibility function with an additional node, in accordance with embodiments.

FIG. 4 is a graph showing the visibility function 300 with an additional node 402, in accordance with embodiments. When a new fragment arrives, the additional node 402 is inserted into the visibility function 300, a partial color sum M may be computed for the additional node 402. Further, the transmittance for each node that is further from the viewer than the additional node is also updated. For ease of description, the list of nodes from node (0) to node (3) has been renumbered to include the additional node (1) at reference number 402.

In embodiments, the transmittance for the new node of the visibility function may be computed as:

Transmittance[I]=Fragment_ Transmittance*Transmittance[I−1]  (3)

wherein I indicates the index of the new node or fragment, the Fragment_Transmittance is the amount of light that is transmitted by the fragment corresponding to the new node, and Transmittance [I−1] is the amount of light transmitted by the fragment of the node that immediately precedes the new node. The transmittance of the additional node (1) at reference number 402 may be found by multiplying the transmittance of the fragment associated with the additional node (1) at reference number 402 by the transmittance of the preceding node. In this example, the preceding node is the node (0) at reference number 302.

After insertion of the new node, the transmittance of the nodes that follow the newly inserted node can be updated. In embodiments, the transmittance for the following nodes may be updated as:

Trans[N]=Fragment_Trans*Trans[N]  (3A)

Wherein Trans [N] is the transmittance of the Nth node and Fragment_Trans is the amount of light that is transmitted by the fragment corresponding to the new node, as discussed above. Accordingly, the new transmittance of each node may be found by multiplying the nodes current transmittance by the transmittance of the new fragment.

In embodiments, the color of the newly inserted node may be computed as:

Color[I]=Fragment_Color*(1−Fragment_Transmittance)  (4)

wherein I indicates the index of the new node or fragment, the Fragment_Transmittance is the amount of light that is transmitted by the fragment corresponding to the new node, and Fragment_Color is the color value of the new fragment. By multiplying the color value of the fragment by one minus the fragment transmittance, the color contribution is inversely proportional to the transmittance of the fragment.

The memory space allocation for the nodes in a visibility function may exceed the actual amount of storage space available for the visibility function. Exemplary methods may build a visibility function within a fixed memory budget per pixel by performing a streaming lossy data compression on the fragment data. This lossy compression method removes details from the visibility function according to their impact on the area under the curve (the data that generates the smallest variation of the area of the curve is removed to keep the total amount of the per-p data bounded).

Figure 5:
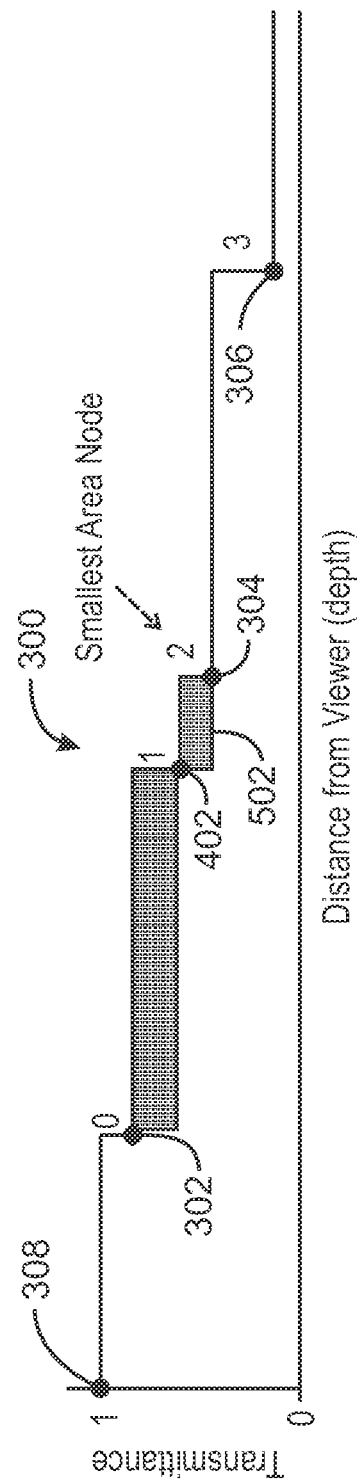
FIG. 5 is a graph showing a visibility function with an area marked for compression, in accordance with embodiments.

FIG. 5 is a graph showing a visibility function 300 with an area 502 marked for compression, in accordance with embodiments. As discussed above, when the number of nodes within a visibility function exceeds the storage space available for the visibility function, the corresponding fragment data may be compressed. In embodiments, the node with the smallest area under the visibility function may be removed.

In examples, the first node represents the first fragment that is closest to the viewer for a pixel. The first fragment often provides visual cues that impart a great deal of information to the graphics rendering process. As a result, the information associated with the first fragment should not be lost. Accordingly, in embodiments, the first node representing the first fragment may not be a candidate for removal when fragment data is compressed.

The visibility function 300 includes four nodes representing four fragments an individual pixel. However, consider the case where the visibility function 300 is limited to storing data for three fragments for each pixel. In such a scenario, the visibility function is limited to three nodes per pixel. Accordingly, the visibility function 300 should be compressed by removing the node that contributes the least amount of information to the visibility function when compared to the other nodes of the visibility function. The node at reference number 304 forms an area 502 under the visibility function 300 that is the smallest area under the visibility function 300 when compared to the other nodes. Thus, when the visibility function is compressed, the node at reference number 304 may be removed from the visibility function. In other words, the transmittance and depth information incorporated into the visibility function 300 by the node at reference number 304 may be removed.

In embodiments, the color information associated with nodes that have been removed from the visibility function during compression may be transferred to other nodes that have not been removed from the visibility function. The color information of a removed node can be distributed over an arbitrary number of nodes. Additionally, the additional color information can be used to improve the compression scheme. To do this, the compression metric may be modified by multiplying the area variation generated by each variation/step in the curve by a new term given by the luminance of the associated partial color sum. This makes it possible to remove information that is less noticeable to the human eye (which is more sensitive to luminance than to chrominance), therefore directly improving image quality with a small extra computational cost. In embodiments, any technique or combination of techniques can be used to maintain the partial color sum associated with the removed nodes when the visibility function is compressed.

In embodiments, the color information of a removed node can be distributed over an arbitrary number of nodes. The color information of a removed node may be distributed over an arbitrary number of nodes using the following equation:

$$\text{Color}[X] += \text{Color}[R] * \text{Trans}[R-1]/\text{Trans}[X]/\text{Number\_of\_Nodes\_Affected} \quad (5)$$

wherein X is all nodes except for the node marked for removal, R is the node that, is marked for removal, and Number_of_Nodes_Affected is the number of nodes that receive a portion of color information from the color information of the removed node. The Number_of_Nodes_Affected can be any arbitrary number. In embodiments, Number_of_Nodes_Affected is selected in order to limit any disruption in graphics rendering.

Figure 6:
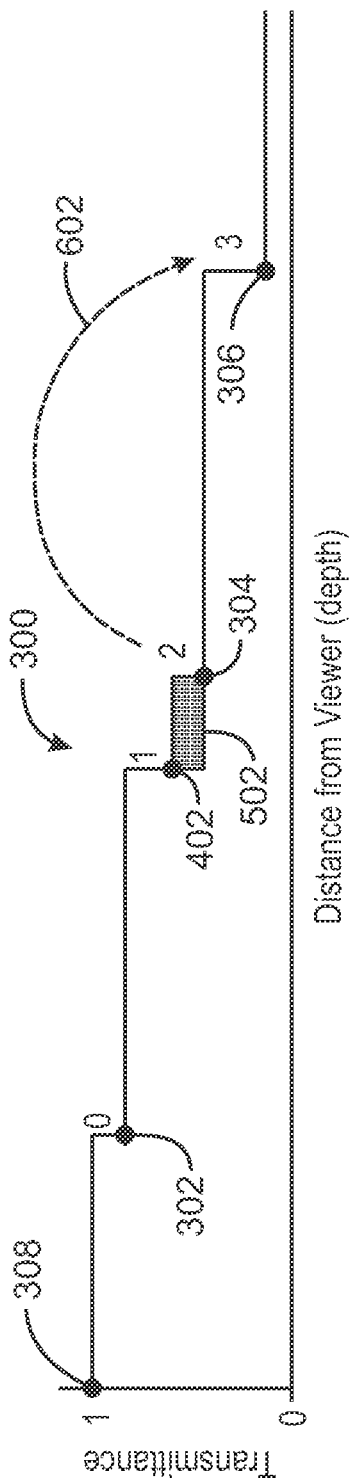
FIG. 6 is a graph showing a visibility function with an area marked for compression and color data transferred to the following node, in accordance with embodiments.

FIG. 6 is a graph showing a visibility function 300 with an area 502 marked for compression and color data transferred to the following node, in accordance with embodiments. As in FIG. 5, the node (2) at reference number 304 is marked for deletion as its corresponding area under the visibility function 300 is the smallest area under the visibility function 300 when compared to the other nodes of the visibility function.

The color of the removed node may be transferred to another node using the following equation:

$$\text{Color}[R+1] += \text{Color}[R] * \text{Trans}[R-1]/\text{Trans}[R] \quad (6)$$

wherein R is the node that is marked for removal. Equation (6) adds the color of the following node to the color of the removed node, multiplied by the transmittance of the preceding node, and divided by the transmittance of the removed node. For example, the node (2) at reference number 304 is marked for removal due to the compression of the visibility function. The color of the node (2) at reference number 304 is transferred to the node (3) at reference number 306. The color of the node (3) at reference number 306 is now equal to the color of the node (3) at reference number 306, plus the color of the node (2) at reference number 304 multiplied by the transmittance of the node (1) at reference number 402, divided by the transmittance of the node (2) at reference number 304. By multiplying the additional color by the divided transmittance term, the additional color that is transferred to the following node is scaled according to the preceding nodes.

Figure 7:
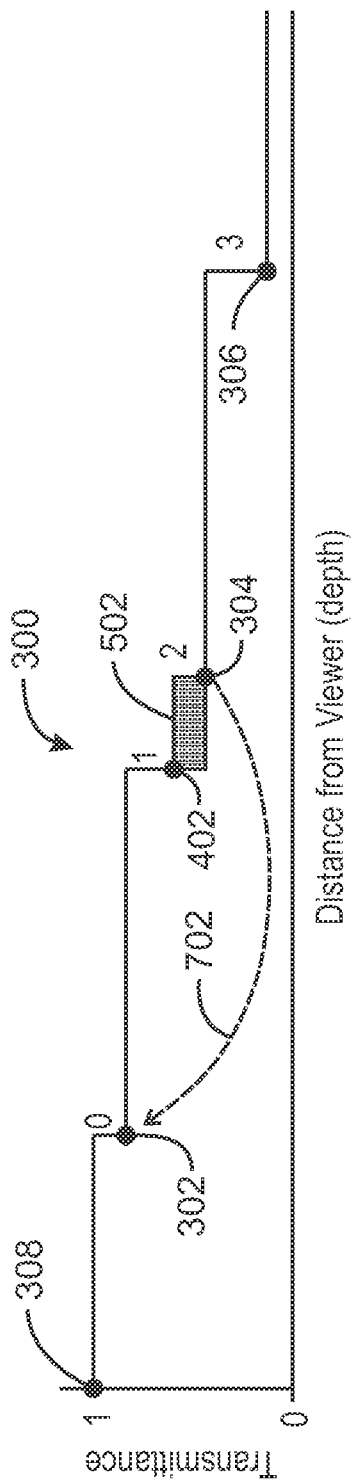
FIG. 7 is a graph showing a visibility function with an area marked for compression and color data transferred to the first node, in accordance with embodiments.

FIG. 7 is a graph showing a visibility function 300 with an area 502 marked for compression and color data transferred to the first node, in accordance with embodiments. As in FIG. 6, the node at reference number 304 is marked for deletion as its corresponding area under the visibility function 300 is the smallest area under the visibility function 300 when compared to the other nodes of the visibility function.

The color of the removed node may be transferred to the first node at reference number 302 as shown by the arrow 702 using the following equation:

$$\text{Color}[0] += \text{Color}[R] * \text{Trans}[R-1] \quad (7)$$

wherein R is the node that is marked for removal, and (0) is the number of the first node at reference number 302 in a list of nodes numbered from node (0) to node (3). Equation (7) adds the color of the first node to the color of the removed node multiplied by the transmittance of the preceding node. For example, the node marked for removal at reference number 304 is the node (2) in a list of nodes numbered from node (0) to node (3). The color of the node (2) at reference number 304 is transferred to the node (0) at reference number 302.

Figure 8:
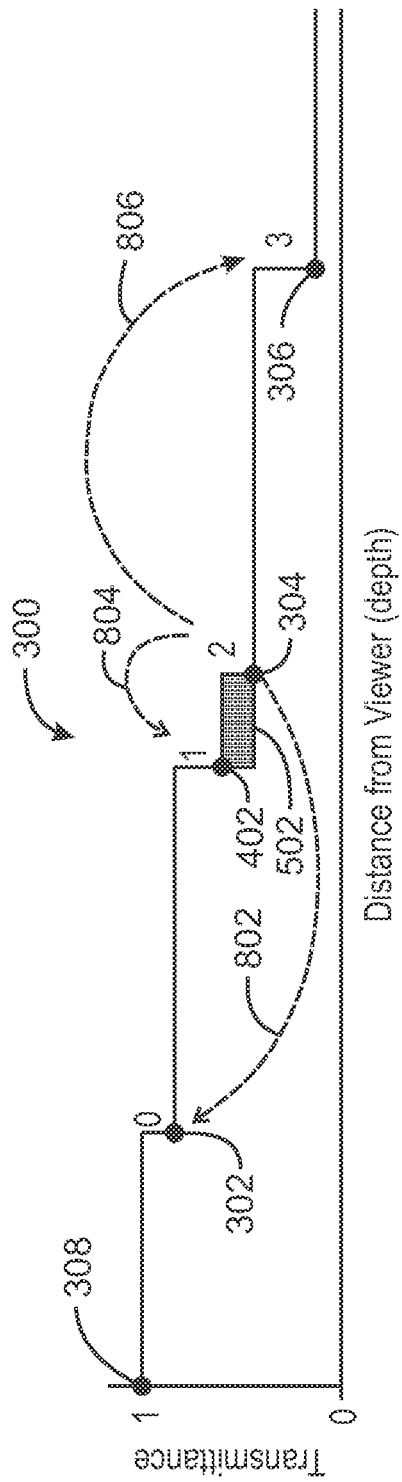
FIG. 8 is a graph showing a visibility function with an area marked for compression and color data transferred to all nodes, in accordance with embodiments.

FIG. 8 is a graph showing a visibility function 300 with an area 502 marked for compression and color data transferred to all nodes, in accordance with embodiments. As in FIG. 7, the node (2) at reference number 304 is marked for deletion as its corresponding area 502 under the visibility function 300 is the smallest area under the visibility function 300 when compared to the other nodes of the visibility function.

The color of the removed node may be transferred to the all remaining nodes of the visibility function 300 as shown by an arrow 802, an arrow 804, and an arrow 806 using the following equation:

$$\text{Color}[X] += \text{Color}[R] * \text{Trans}[R-1]/\text{Trans}[X]/\text{Max\_Nodes} \quad (8)$$

wherein X is all nodes except for the node marked for removal, R is the node that is marked for removal, and Max_Nodes is the maximum number of nodes that can be stored by the visibility function with respect to the memory limitations for each pixel. For example, the color of node (1) at reference number 302 would be equal to the initial color of node (1) at reference number 302, plus the color of the node (2) marked for removal at reference number 304 multiplied by the transmittance of node (1) at reference number 302 divided by the total transmittance of all nodes, divided by the maximum number of nodes that can be stored by the visibility function with respect to the memory limitations for each pixel.

Figure 9:
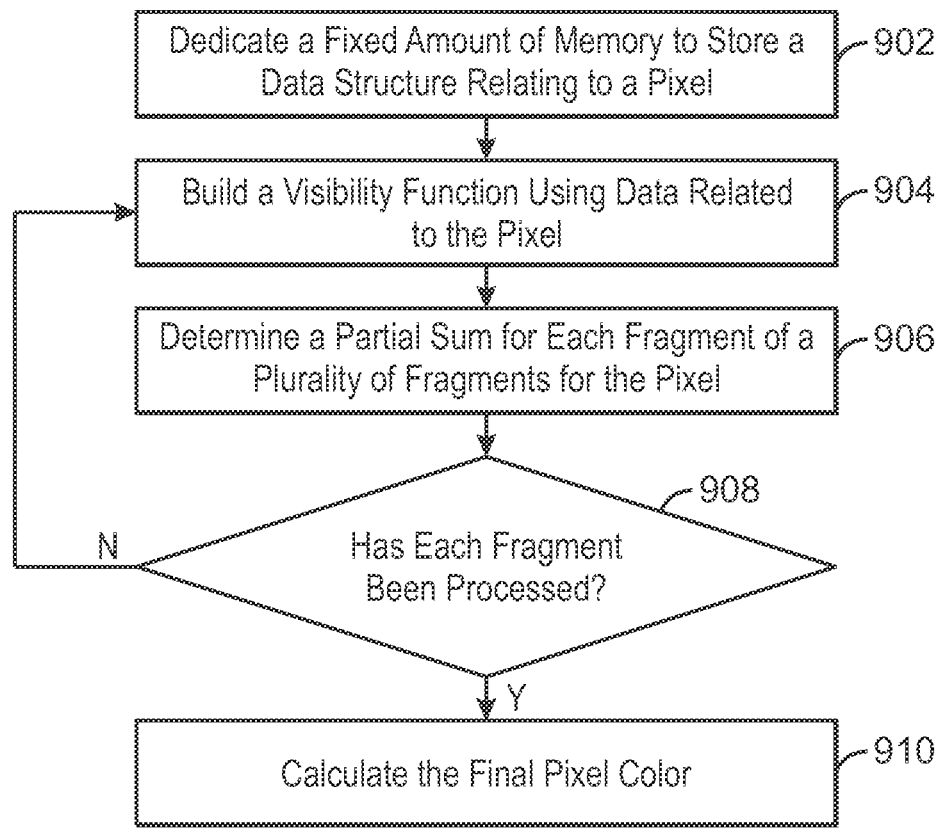
FIG. 9 is process flow diagram showing an embodiment of a method for rendering an image, in accordance with embodiments.

FIG. 9 is process flow diagram showing an embodiment of a method 900 for rendering an image, in accordance with embodiments. The method 900 relates to producing an image to be displayed. The image typically is made up of a plurality of pixels. Each of the blocks in the method 900 may be performed in any order, sequentially or concurrently.

At block 902, a fixed amount of memory is dedicated to store a data structure for each pixel of a plurality of pixels. Accordingly, each pixel of an image to be rendered has a data structure store in memory. As explained herein, an embodiment is able to provide high-quality rendering in real-time using a fixed amount of memory.

A visibility function is built, as shown at block 904, using data related to the pixel. A read-modify-write operation may be performed on the locations of the data structure to alter the data at a plurality of nodes of the visibility function. During the read-modify-write operation, the data may be read from the data structure, modified in some manner, and the written back to the data structure. As discussed above, each node of the plurality of nodes corresponds to a fragment that contributes to the final color of the pixel. The visibility function may be store in the data structure. In this manner, the pixel data may be calculated in a streaming fashion, rather than by buffering pixel data in advance.

At block 906, a partial color sum for each fragment of the plurality of fragments for the pixel may be determined. As discussed above, the partial color sum of the new fragment may be the color contribution of the incoming fragment multiplied by its transmittance term (i.e. 1−α). In embodiments, the visibility function may be built concurrently with determining the partial color sum for each fragment. Moreover, in embodiments, the same read-modify-write operation that is used to build the visibility function can be used to determine the partial color sum for each fragment. For example, each time a new fragment is introduced, the current partial color sum may be read. The current partial color sum is then modified according to the particular technique used to distribute color sums across the nodes of the pixel. The modified partial color sum may then be written back to memory. In embodiments, a new read-modify-write operation is used to determine the partial color sum.

At block 908, it is determined if each fragment of the plurality of pixels has been processed. If each fragment of the plurality of pixels has not been processed, then process flow continues to block 904. If each fragment of the plurality of pixels not been processed, then process flow continues to block 910. In this manner, each time a new fragment is injected into a processing pipeline for the pixel, it can be added to the visibility function and the partial color sum for the fragment may be determined.

At block 910, a pixel color is calculated. The pixel color may be a final pixel color that is the result of all N fragments. The final pixel color may be calculated partial color sum using the summation in Equation (2). The summation may include the visibility function for each of the N fragments. The final pixel color represents the contribution of N overlapping transparent fragments for each pixel. As discussed above, each term in the sum may be given by the fragment color (c) multiplied by its a (transparency factor) and a visibility term that accounts for all the fragments between the camera/viewer and the current fragment.

The process flow diagrams of FIG. 9 is not intended to indicate that the blocks of method 900 are to be executed in any particular order, or that all of the blocks are to be included in every case. Further, any number of additional blocks may be included within the method 900, depending on the details of the specific implementation.

Figure 10:
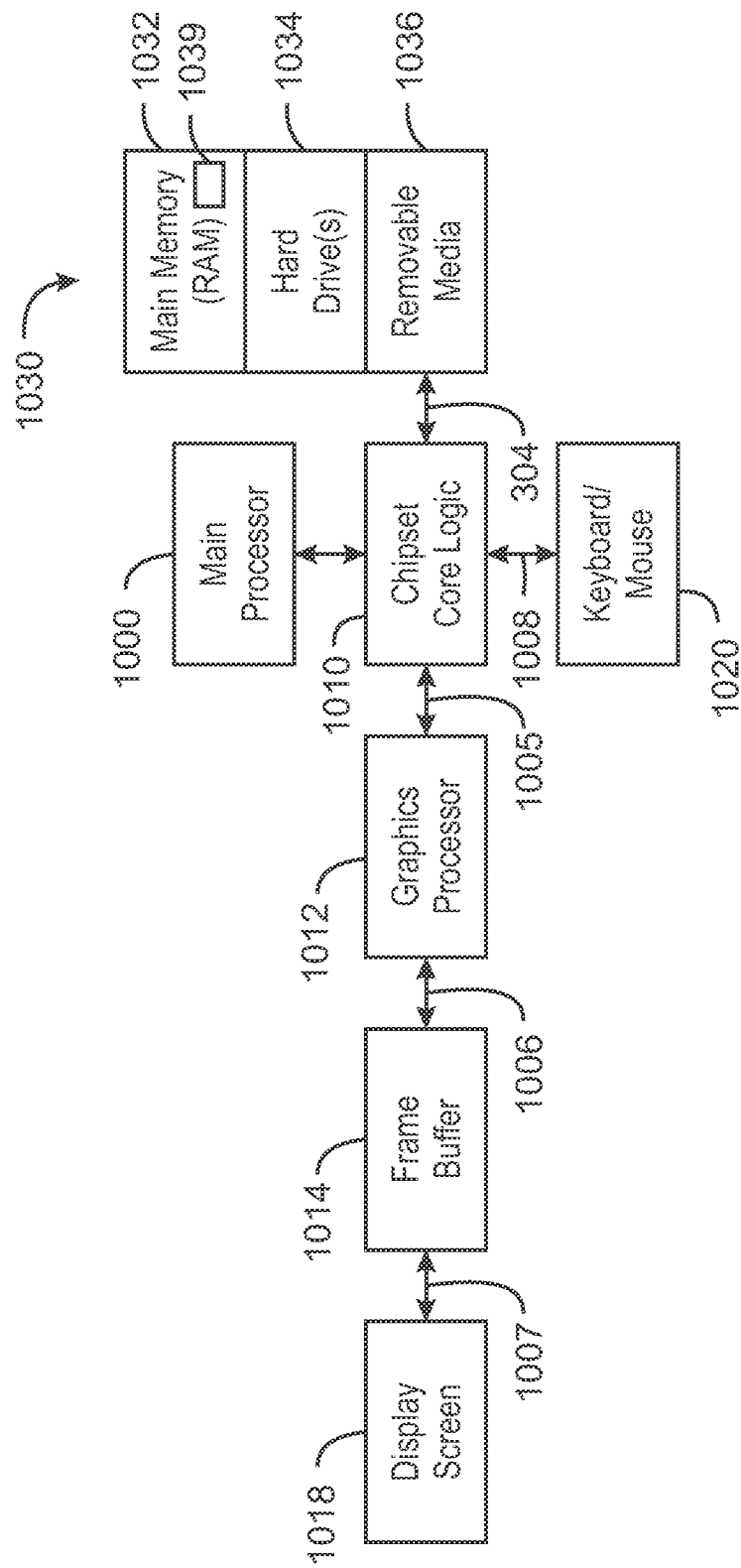
FIG. 10 is a block diagram of a computing device that may be used for rendering an image, in accordance with embodiments.

FIG. 10 is a block diagram of a computing device 1000 that may be used for rendering an image, in accordance with embodiments. The computer system 1030, shown in FIG. 10, may include a hard drive 1034 and a removable medium 1036, coupled by a bus 1004 to a chipset core logic 1010. A keyboard and mouse 1020, or other conventional components, may be coupled to the chipset core logic via bus 1008. The core logic may couple to the graphics processor 1012, via a bus 1005, and the central processor 1000 in one embodiment. The graphics processor 1012 may also be coupled by a bus 1006 to a frame buffer 1014. The frame buffer 1014 may be coupled by a bus 1007 to a display screen 1018. In one embodiment, a graphics processor 1012 may be a multi-threaded, multi-core parallel processor using single instruction multiple data (SIMD) architecture.

In the case of a software implementation, the pertinent code may be stored in any suitable semiconductor, magnetic, or optical memory, including the main memory 1032 (as indicated at 1039) or any available memory within the graphics processor. Thus, in one embodiment, the code to perform the sequences of FIG. 9 may be stored in a non-transitory machine or computer readable medium, such as the memory 1032, and/or the graphics processor 1012, and/or the central processor 1000 and may be executed by the processor 1000 and/or the graphics processor 1012 in one embodiment.

Figure 11:
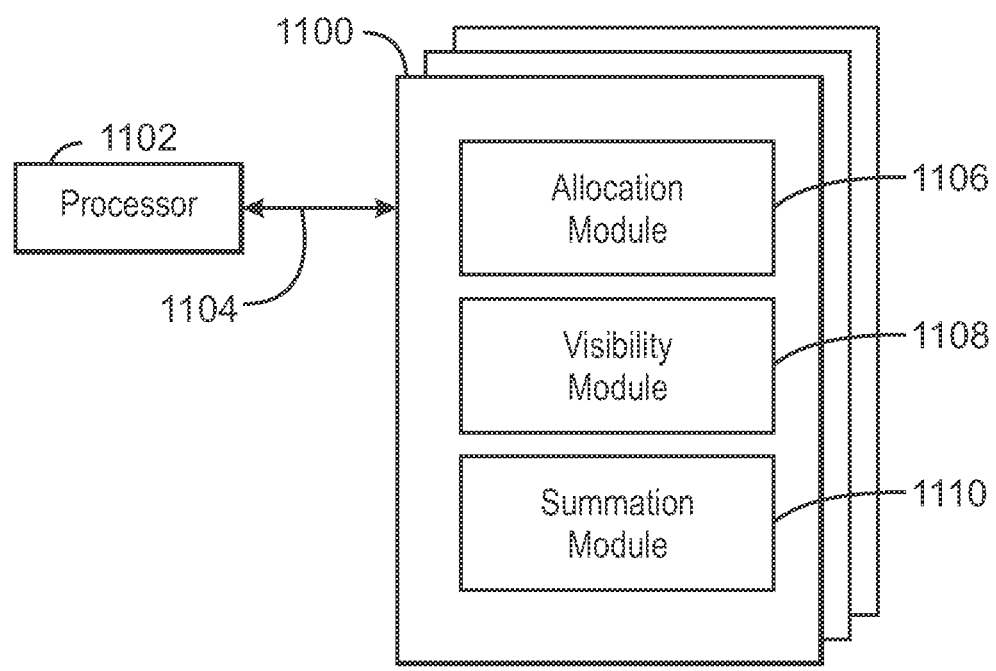
FIG. 11 is a block diagram showing tangible, non-transitory computer-readable media that stores code for rendering an image, in accordance with embodiments.

FIG. 11 is a block diagram showing tangible, non-transitory computer-readable media 1100 that stores code for rendering an image, in accordance with embodiments. The tangible, non-transitory computer-readable media 1100 may be accessed by a processor 1102 over a computer bus 1104. Furthermore, the tangible, non-transitory computer-readable media 1100 may include code configured to direct the processor 1102 to perform the methods described herein.

The various software components discussed herein may be stored on the tangible, non-transitory computer-readable media 1100, as indicated in FIG. 11. An allocation module 1106 may be configured to dedicate a fixed amount of memory to store a data structure relating a pixel of the plurality of pixels. Further, a visibility module 1108 may be configured to build a visibility function using data related to the pixel by performing a read-modify-write operation on locations of the data structure to alter the data at a plurality of nodes of the visibility function that correspond to a plurality of fragments of the pixel. A summation module 1110 may determine a partial color sum for each fragment of the plurality of fragments for each pixel of the image to be displayed. Further the summation module 1110 may compute the final pixel color that represents the contribution of all overlapping fragments for each pixel.

The block diagram of FIG. 11 is not intended to indicate that the tangible, non-transitory computer-readable media 1100 is to include all of the components shown in FIG. 11. Further, the tangible, non-transitory computer-readable media 1100 may include any number of additional components not shown in FIG. 11, depending on the details of the specific implementation.

Figure 12:
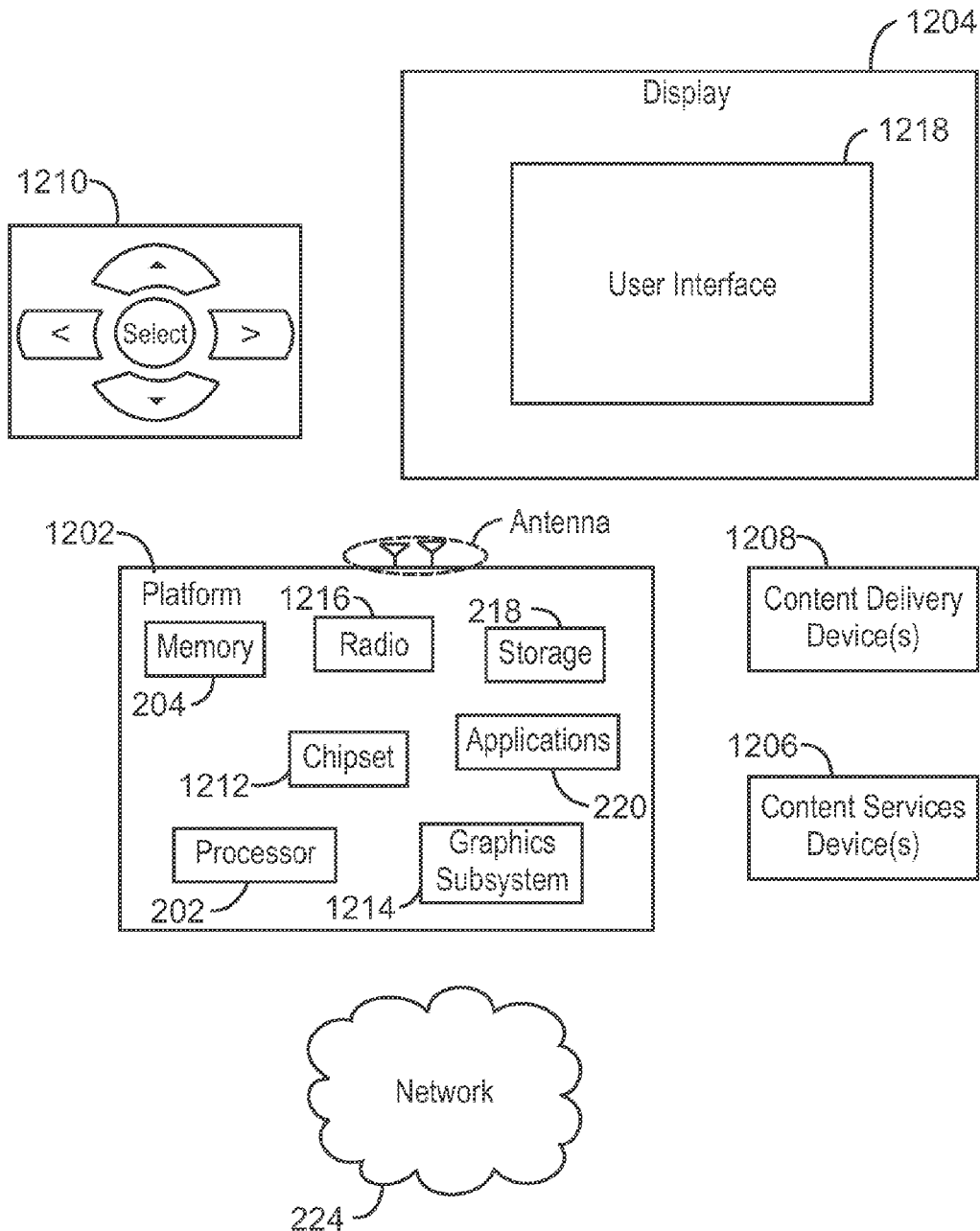
FIG. 12 is a block diagram of an exemplary system for rendering an image, in accordance with embodiments.

FIG. 12 is a block diagram of an exemplary system 1200 for rendering an image, in accordance with embodiments. Like numbered items are as described with respect to FIG. 2. In some embodiments, the system 1200 is a media system. In addition, the system 1200 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, or the like.

In various embodiments, the system 1200 comprises a platform 1202 coupled to a display 1204. The platform 1202 may receive content from a content device, such as content services device(s) 1206 or content delivery device(s) 1208, or other similar content sources. A navigation controller 1210 including one or more navigation features may be used to interact with, for example, the platform 1202 and/or the display 1204. Each of these components is described in more detail below.

The platform 1202 may include any combination of a chipset 1212, a central processing unit (CPU) 202, a memory device 204, a storage device 218, a graphics subsystem 1214, applications 220, and a radio 1216. The chipset 1212 may provide intercommunication among the CPU 202, the memory device 204, the storage device 218, the graphics subsystem 1214, the applications 220, and the radio 1216. For example, the chipset 1212 may include a storage adapter (not shown) capable of providing intercommunication with the storage device 218.

The processor 202 may be implemented as Complex Instruction Set Computer (CISC) or Reduced Instruction Set Computer (RISC) processors, x86 Instruction set compatible processors, multi-core, or any other microprocessor or central processing unit (CPU). In some embodiments, the processor 202 includes dual-core processor(s), dual-core mobile processor(s), or the like.

The memory device 204 may be implemented as a volatile memory device such as, but not limited to, a Random Access Memory (RAM), Dynamic Random Access Memory (DRAM), or Static RAM (SRAM). The storage device 218 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In some embodiments, the storage device 218 includes technology to increase the storage performance enhanced protection for valuable digital media when multiple hard drives are included, for example.

The graphics subsystem 1214 may perform processing of images such as still or video for display. The graphics subsystem 1214 may include a graphics processing unit (GPU), such as the GPU 206, or a visual processing unit (VPU), for example. An analog or digital interface may be used to communicatively couple the graphics subsystem 1214 and the display 1204. For example, the interface may be any of a High-Definition Multimedia Interface, DisplayPort, wireless HDMI, and/or wireless HD compliant techniques. The graphics subsystem 1214 may be integrated into the processor or the chipset 1212. Alternatively, the graphics subsystem 1214 may be a stand-alone card communicatively coupled to the chipset 1212.

The graphics and/or video processing techniques described herein may be implemented in various hardware architectures. For example, graphics and/or video functionality may be integrated within the chipset 1212. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

The radio 1216 may include one or more radios capable of transmitting and receiving signals using various suitable wireless communications techniques. Such techniques may involve communications across one or more wireless networks. Exemplary wireless networks include wireless local area networks (WLANs), wireless personal area networks (WPANs), wireless metropolitan area network (WMANs), cellular networks, satellite networks, or the like. In communicating across such networks, the radio 1216 may operate in accordance with one or more applicable standards in any version.

The display 1204 may include any television type monitor or display. For example, the display 1204 may include a computer display screen, touch screen display, video monitor, television, or the like. The display 1204 may be digital and/or analog. In some embodiments, the display 1204 is a holographic display. Also, the display 1204 may be a transparent surface that may receive a visual projection. Such projections may convey various forms of information, images, objects, or the like. For example, such projections may be a visual overlay for a mobile augmented reality (MAR) application. Under the control of one or more applications 220, the platform 1202 may display a user interface 1218 on the display 1204.

The content services device(s) 1206 may be hosted by any national, international, or independent service and, thus, may be accessible to the platform 1202 via the Internet, for example. The content services device(s) 1206 may be coupled to the platform 1202 and/or to the display 1204. The platform 1202 and/or the content services device(s) 1206 may be coupled to a network 224 to communicate (e.g., send and/or receive) media information to and from the network 224. The content delivery device(s) 1208 also may be coupled to the platform 1202 and/or to the display 1204.

The content services device(s) 1206 may include a cable television box, personal computer, network, telephone, or Internet-enabled device capable of delivering digital information. In addition, the content services device(s) 1206 may include any other similar devices capable of unidirectionally or bidirectionally communicating content between content providers and the platform 1202 or the display 1204, via the network 224 or directly. It will be appreciated that the content may be communicated unidirectionally and/or bidirectionally to and from any one of the components in the system 1200 and a content provider via the network 224. Examples of content may include any media information including, for example, video, music, medical and gaming information, and so forth.

The content services device(s) 1206 may receive content such as cable television programming including media information, digital information, or other content. Examples of content providers may include any cable or satellite television or radio or Internet content providers, among others.

In some embodiments, the platform 1202 receives control signals from the navigation controller 1210, which includes one or more navigation features. The navigation features of the navigation controller 1210 may be used to interact with the user interface 1218, for example. The navigation controller 1210 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures. Physical gestures include but are not limited to facial expressions, facial movements, movement of various limbs, body movements, body language or any combination thereof. Such physical gestures can be recognized and translated into commands or instructions.

Movements of the navigation features of the navigation controller 1210 may be echoed on the display 1204 by movements of a pointer, cursor, focus ring, or other visual indicators displayed on the display 1204. For example, under the control of the applications 220, the navigation features located on the navigation controller 1210 may be mapped to virtual navigation features displayed on the user interface 1218. In some embodiments, the navigation controller 1210 may not be a separate component but, rather, may be integrated into the platform 1202 and/or the display 1204.

The system 1200 may include drivers (not shown) that include technology to enable users to instantly turn on and off the platform 1202 with the touch of a button after initial boot-up, when enabled, for example. Program logic may allow the platform 1202 to stream content to media adaptors or other content services device(s) 1206 or content delivery device(s) 1208 when the platform is turned "off." In addition, the chipset 1212 may include hardware and/or software support for 12.1 surround sound audio and/or high definition 7.1 surround sound audio, for example. The drivers may include a graphics driver for integrated graphics platforms. In some embodiments, the graphics driver includes a peripheral component interconnect express (PCIe) graphics card.

In various embodiments, any one or more of the components shown in the system 1200 may be integrated. For example, the platform 1202 and the content services device(s) 1206 may be integrated; the platform 1202 and the content delivery device(s) 1208 may be integrated; or the platform 1202, the content services device(s) 1206, and the content delivery device(s) 1208 may be integrated. In some embodiments, the platform 1202 and the display 1204 are an integrated unit. The display 1204 and the content service device(s) 1206 may be integrated, or the display 1204 and the content delivery device(s) 1208 may be integrated, for example.

The system 1200 may be implemented as a wireless system or a wired system. When implemented as a wireless system, the system 1200 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum. When implemented as a wired system, the system 1200 may include components and interfaces suitable for communicating over wired communications media, such as input/output (I/O) adapters, physical connectors to connect the I/O adapter with a corresponding wired communications medium, a network interface card (NIC), disc controller, video controller, audio controller, or the like Examples of wired communications media may include a wire, cable, metal leads, printed circuit board (PCB), backplane, switch fabric, semiconductor material, twisted-pair wire, co-axial cable, fiber optics, or the like.

The platform 1202 may establish one or more logical or physical channels to communicate information. The information may include media information and control information. Media information may refer to any data representing content meant for a user. Examples of content may include, for example, data from a voice conversation, videoconference, streaming video, electronic mail (email) message, voice mail message, alphanumeric symbols, graphics, image, video, text, and the like. Data from a voice conversation may be, for example, speech information, silence periods, background noise, comfort noise, tones, and the like. Control information may refer to any data representing commands, instructions or control words meant for an automated system. For example, control information may be used to route media information through a system, or instruct a node to process the media information in a predetermined manner. The embodiments, however, are not limited to the elements or the context shown or described in FIG. 12.

Figure 13:
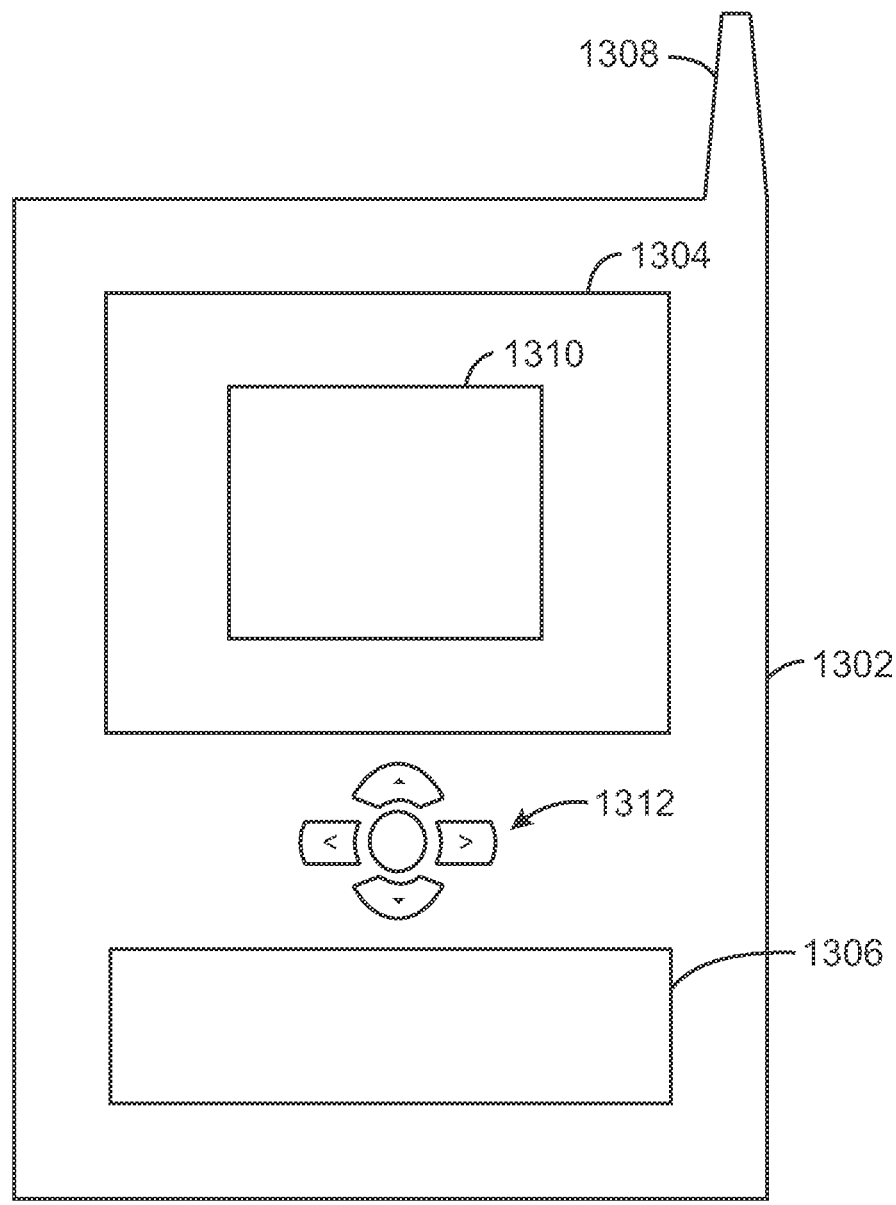
FIG. 13 is a schematic of a small form factor device in which the system of FIG. 12 may be embodied, in accordance with embodiments.

FIG. 13 is a schematic of a small form factor device 1300 in which the system 1200 of FIG. 12 may be embodied, in accordance with embodiments. Like numbered items are as described with respect to FIG. 12. In some embodiments, for example, the device 1300 is implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile Internet device (MID), messaging device, data communication device, and the like.

An example of a mobile computing device may also include a computer that is arranged to be worn by a person, such as a wrist computer, finger computer, ring computer, eyeglass computer, belt-clip computer, arm-band computer, shoe computer, clothing computer, or any other suitable type of wearable computer. For example, the mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well.

As shown in FIG. 13, the device 1300 may include a housing 1302, a display 1304, an input/output (I/O) device 1306, and an antenna 1308. The device 1300 may also include navigation features 1310. The display 1304 may include any suitable display unit for displaying information appropriate for a mobile computing device. The I/O device 1306 may include any suitable I/O device for entering information into a mobile computing device. For example, the I/O device 1306 may include an alphanumeric keyboard, a numeric keypad, a touch pad, input keys, buttons, switches, rocker switches, microphones, speakers, a voice recognition device and software, or the like, Information may also be entered into the device 1300 by way of microphone. Such information may be digitized by a voice recognition device.

Example 1

A method for rendering an image, the image comprising a plurality of pixels, is described herein. The method includes dedicating a fixed amount of memory to store a data structure for a pixel of the plurality of pixels. A visibility function may be built using data related to the pixel by performing a read-modify-write operation on locations of the data structure to alter the data at a plurality of nodes of the visibility function, wherein the plurality of nodes corresponds to a plurality of fragments for the pixel. Additionally, a partial color sum may be determined for each fragment of the plurality of fragments for the pixel using the read-modify-write operation. A final pixel color may be calculated using the visibility function and the partial color sum for each fragment of the plurality of fragments.

Determining the partial color sum may include multiplying a fragment color by a fragment transparency for each fragment of the plurality of fragments. Additionally, building the visibility function for the pixel may be performed by obtaining a list of all fragments that contribute to the pixel. The method may further include storing the partial color sum for each fragment of the pixel in another data structure, and updating the partial color sum in a streaming fashion.

Additionally, the visibility function may be compressed by removing the node of a visibility function that has a smallest area under the visibility function and a corresponding fragment of the pixel. A color information is maintained for a node and corresponding fragment that is removed from the visibility function during compression by transferring the color information to a following node. A color information may also be maintained for a node and corresponding fragment that is removed from the visibility function during compression by transferring the color information to a first node. Moreover, a color information may be maintained for a node and corresponding fragment that is removed from the visibility function during compression by transferring the color information to all remaining nodes. The method may also maintain a color information for a node and corresponding fragment that is removed from the visibility function during compression by transferring the color information to an arbitrary number of nodes. Additionally, the quality of the image may be proportional to a size of the fixed amount of memory.

Example 2

A computing device is described herein. The computing device includes a processing unit that is configured to execute stored instructions; and a storage device that stores instructions. The storage device includes processor executable code that, when executed by the processing unit, is configured to provide a memory budget to store a data structure relating to a pixel of a plurality of pixels that make up an image. A visibility function is computed using data related to a plurality of fragments for the pixel by performing a read-modify-write operation on the locations of the data structure to alter the data related to the plurality of fragments. A partial color sum is determined for each fragment of the plurality of fragments for the pixel of the image using the read-modify-write operation. A final pixel color may be computed using the visibility function and the partial color sum for each fragment of the plurality of fragments.

Determining the partial color sum may include multiplying a fragment color by a fragment transparency for each fragment of the plurality of fragments. The visibility function may be computed for the pixel by obtaining a list of all fragments that contribute to the pixel. The partial color sum for each fragment of the plurality of fragments may be stored in another data structure and updated in a streaming fashion.

The visibility function may be compressed by removing a fragment of the visibility function that contributes the least data to the visibility function when compared to the other fragments of the visibility function. A color information may be maintained for a fragment that is removed from the visibility function during compression by transferring the color information to a following fragment. A color information may also be maintained for a fragment that is removed from the visibility function during compression by transferring the color information to a first fragment. Additionally, a color information may be maintained for a fragment that is removed from the visibility function during compression by transferring the color information to all remaining fragments. Further, a color information may be maintained for a node and corresponding fragment that is removed from the visibility function during compression by transferring the color information to an arbitrary number of fragments. Further, the computing device may include a radio and a display, the radio and display communicatively coupled at least to the central processing unit.

Example 3

At least one non-transitory machine readable medium having instructions stored therein is described herein. In response to being executed on a computing device, the instructions cause the computing device to dedicate a fixed amount of memory to store a data structure for a pixel of the plurality of pixels. A visibility function may be built using data related to the pixel by performing a read-modify-write operation on locations of the data structure to alter the data at a plurality of nodes of the visibility function, wherein the plurality of nodes corresponds to a plurality of fragments for the pixel. A partial color sum may be determined for each fragment of the plurality of fragments for the pixel using the read-modify-write operation. A final pixel color may be calculated using the visibility function and the partial color sum for each fragment of the plurality of fragments.

Determining the partial color sum may include multiplying a fragment color by a fragment transparency for each fragment of the plurality of fragments. Additionally, building the visibility function for the pixel may be performed by obtaining a list of all fragments that contribute to the pixel. The method may further include storing the partial color sum for each fragment of the pixel in another data structure, and updating the partial color sum in a streaming fashion.

Additionally, the visibility function may be compressed by removing a node of the visibility function that has a smallest area under the visibility function and a corresponding fragment of the pixel. A color information is maintained for a node and corresponding fragment that is removed from the visibility function during compression by transferring the color information to a following node. A color information may also be maintained for a node and corresponding fragment that is removed from the visibility function during compression by transferring the color information to a first node. Moreover, a color information may be maintained for a node and corresponding fragment that is removed from the visibility function during compression by transferring the color information to all remaining nodes. The color information may also be maintained for a node and corresponding fragment that is removed from the visibility function during compression by transferring the color information to an arbitrary number of nodes. Additionally, the quality of the image may be proportional to a size of the fixed amount of memory.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the inventions are not limited to those diagrams or to corresponding descriptions herein. For example, flow need not move through each illustrated box or state or in exactly the same order as illustrated and described herein.

The inventions are not restricted to the particular details listed herein. Indeed, those skilled in the art having the benefit of this disclosure will appreciate that many other variations from the foregoing description and drawings may be made within the scope of the present inventions. Accordingly, it is the following claims including any amendments thereto that define the scope of the inventions.

What is claimed is:

1. A method for rendering an image, the image comprising a plurality of pixels, the method comprising:
   dedicating a fixed amount of memory to store a data structure for a pixel of the plurality of pixels;
   building a visibility function using data related to the pixel by performing a read-modify-write operation on locations of the data structure to alter the data at a plurality of nodes of the visibility function, wherein the plurality of nodes corresponds to a plurality of fragments for the pixel;
   determining a partial color sum for each fragment of the plurality of fragments for the pixel using the read-modify-write operation; and
   calculating a pixel color using the visibility function and the partial color sum for each fragment of the plurality of fragments, wherein a color information is maintained for a node and corresponding fragment that is removed from the visibility function during compression by transferring the color information to an arbitrary number of nodes.

2. The method recited in claim 1, wherein determining the partial color sum for each fragment comprises multiplying a fragment color by a fragment transparency for each fragment of the plurality of fragments.

3. The method recited in claim 1, comprising building the visibility function for the pixel by obtaining a list of all fragments that contribute to the pixel.

4. The method recited in claim 1, wherein the partial color sum for each fragment of the pixel is stored in another data structure and updated in a streaming fashion.

5. The method recited in claim 1, wherein the visibility function is compressed by removing a node of the visibility function that has a smallest area under the visibility function and a corresponding fragment of the pixel.

6. The method recited in claim 1, wherein a color information is maintained for a node and corresponding fragment that is removed from the visibility function during compression by transferring the color information to a following node.

7. The method recited in claim 1, wherein a color information is maintained for a node and corresponding fragment that is removed from the visibility function during compression by transferring the color information to a first node.

8. The method recited in claim 1, wherein a color information is maintained for a node and corresponding fragment that is removed from the visibility function during compression by transferring the color information to all remaining nodes.

9. The method recited in claim 1, wherein a quality of the image is proportional to a size of the fixed amount of memory.

10. A computing device, comprising:
  a processing unit that is configured to execute stored instructions; and
  a storage device that stores instructions, the storage device comprising processor executable code that, when executed by the processing unit, is adapted to:
    provide a memory budget to store a data structure relating to a pixel of a plurality of pixels that make up an image;
    compute a visibility function using data related to a plurality of fragments for the pixel by performing a read-modify-write operation on the locations of the data structure to alter the data related to the plurality of fragments;
    determine a partial color sum for each fragment of the plurality of fragments for the pixel of the image using the read-modify-write operation; and
    compute a pixel color using the visibility function and the partial color sum for each fragment of the plurality of fragments, wherein a color information is maintained for a node and corresponding fragment that is removed from the visibility function during compression by transferring the color information to an arbitrary number of fragments.

11. The computing device recited in claim 10, wherein determining the partial color sum for each fragment comprises multiplying a fragment color by a fragment transparency for each fragment of the plurality of fragments.

12. The computing device recited in claim 10, wherein the processing unit is to compute a visibility function for the pixel by the use of a list of all fragments that contribute to the pixel.

13. The computing device recited in claim 10, wherein the computing device is to store the partial color sum for each fragment of the plurality of fragments in another data structure, and update the partial color sum in a streaming fashion.

14. The computing device recited in claim 10, wherein the processing unit is to compress the visibility function by removal of a fragment of the visibility function that contributes the least data to the visibility function when in comparison to the other fragments of the visibility function.

15. The computing device recited in claim 10, wherein the computing device maintains a color information for a fragment that is removed from the visibility function during compression by the transfer of the color information to a following fragment.

16. The computing device recited in claim 10, wherein the computing device maintains a color information for a fragment that is removed from the visibility function during compression by the transfer of the color information to a first fragment.

17. The computing device recited in claim 10, wherein a color information is maintained for a fragment that is removed from the visibility function during compression by transferring the color information to all remaining fragments.

18. The computing device recited in claim 10, further comprising a radio and a display, the radio and display communicatively coupled at least to llthell a central processing unit.

19. At least one non-transitory machine readable medium having instructions stored therein that, in response to being executed on a computing device, cause the computing device to:
  dedicate a fixed amount of memory to store a data structure for a pixel of a plurality of pixels;
  build a visibility function using data related to the pixel by performing a read-modify-write operation on locations of the data structure to alter the data at a plurality of nodes of the visibility function, wherein the plurality of nodes corresponds to a plurality of fragments for the pixel;
  determine a partial color sum for each fragment of the plurality of fragments for the pixel using the read-modify-write operation; and
  calculate a pixel color using the visibility function and the partial color sum for each fragment of the plurality of fragments, wherein a color information is maintained for a node and corresponding fragment that is removed from the visibility function during compression by transferring the color information to an arbitrary number of nodes.

20. The non-transitory machine readable medium recited in claim 19, wherein determining the partial color sum for each fragment comprises multiplying a fragment color by a fragment transparency for each fragment of the plurality of fragments.

21. The non-transitory machine readable medium recited in claim 19, comprising building the visibility function for the pixel by obtaining a list of all fragments that contribute to the pixel.

22. The non-transitory machine readable medium recited in claim 19, wherein the partial color sum for each fragment of the pixel is stored in another data structure and updated in a streaming fashion.

23. The machine non-transitory readable medium recited in claim 19, wherein the visibility function is compressed by removing a node of the visibility function that has a smallest area under the visibility function and a corresponding fragment of the pixel.

24. The non-transitory machine readable medium recited in claim 19, wherein a color information is maintained for a node and corresponding fragment that is removed from the visibility function during compression by transferring the color information to a following node.

25. The non-transitory machine readable medium recited in claim 19, wherein a color information is maintained for a node and corresponding fragment that is removed from the visibility function during compression by transferring the color information to a first node.

26. The non-transitory machine readable medium recited in claim 19, wherein a color information is maintained for a node and corresponding fragment that is removed from the visibility function during compression by transferring the color information to all remaining nodes.

27. The non-transitory machine readable medium recited in claim 19, wherein a quality of the image is proportional to a size of the fixed amount of memory.

* * * * *